Patented May 14, 1929.

1,712,753

UNITED STATES PATENT OFFICE.

HERBERT W. DAUDT, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF PRODUCING BENZOIC ACID.

No Drawing. Application filed January 23, 1924. Serial No. 688,104.

This invention relates to the production of benzoic acid, and comprises a process of making benzoic acid from phthalic acid or metal acid phthalates by heating at a temperature of between 150 and 300° C. in the presence of a catalyst, a metal acid phthalate or phthalic acid mixed with such an amount of a metal compound as will form the corresponding metal acid phthalate, as distinguished from the neutral phthalate; or, a mixture of the above with phthalic acid.

As examples of catalysts which are suitable, there may be mentioned compounds of copper and of mercury, and particularly the salts of these metals. I have found the water soluble salts such, for example, as the sulfates and chlorides of copper and mercury respectively, to form excellent catalysts for the above described reaction. It is, however, not necessary to use the catalyst in the form of a salt, since other derivatives of the metals, such as the oxide (copper oxide) may be used. These catalysts may be referred to generically as derivatives (or compounds) of metals or variable valence whose specific gravities are between 8.9 and 13.6, and whose maximum valence is less than 3.

My process may be illustrated by the following example:

While agitating 500 pounds of 8.4% sodium hydroxide solution contained in an autoclave, preferably copper-lined, there is added 296 pounds of 100% phthalic anhydride and 3 pounds of copper sulfate crystals. The resulting mixture is then heated at a temperature of from about 200 to 220° C. for a period of about 5 hours. After cooling, the reaction product is dissolved in a slight excess of sodium hydroxide solution, and the insoluble material is filtered off. The benzoic acid formed is precipitated from the filtrate by adding sulfuric acid thereto. This crude benzoic acid can then be purified in the usual manner.

Although I have illustrated my process in considerable detail, it will be understood that my invention is not limited to the specific proportions or conditions specified therein.

I claim:

1. The process of producing benzoic acid which comprises heating a solution of a metal acid phthalate, at a temperature of between about 150 and 300° C. in the presence of heavy metal salts capable of forming phthalates, and capable of splitting off $CO_2$ from phthalic acid.

2. A process as defined in claim 1, in which the catalyst comprises a copper compound, capable of forming a copper salt upon the addition of an acid solution.

3. A process as defined in claim 1 in which the catalyst is a salt of copper.

4. A process as defined in claim 1 in which the catalyst is a water soluble, mineral acid salt of copper.

5. The process of producing benzoic acid which comprises heating at a temperature of from about 150 to 300° C. in the presence of a heavy metal salts, an aqueous solution containing an acid sodium phthalate and phthalic acid, said heavy metal salts being capable of splitting off $CO_2$ from said acid phthalate.

6. A process as defined in claim 5 in which the temperature is maintained at from about 200 to 225° C.

7. A process as defined in claim 5 in which the temperature is maintained at from about 200 to 225° C., and the catalyst is a salt of copper.

8. A process as defined in claim 5 in which the catalyst is a compound of a metal of variable valence whose specific gravity is between 8.9 and 13.6, and whose maximum valence is less than 3.

9. The process of producing benzoic acid which comprises heating at a temperature of from about 150° to 300° C. in the presence of a catalyst, an aqueous solution containing an acid phthalate, said catalyst forming a heavy metal phthalate, and breaking down said heavy metal phthalate to form benzoic acid.

10. The process of producing benzoic acid which comprises heating a solution of an acid phthalate at a temperature of between 150° and 300° C. in the presence of a copper catalyst, said catalyst combining with the acid phthalate to form a copper phthalate and breaking down said copper phthalate to form benzoic acid.

11. A process as defined in claim 1 in which the metal is a member of the alkali group.

In testimony whereof I affix my signature.

HERBERT W. DAUDT.